United States Patent [19]

Kurkjian, Jr.

[11] Patent Number: 5,069,240

[45] Date of Patent: Dec. 3, 1991

[54] FLEXIBLE SEATING STRUCTURE FOR ROTARY VALVES

[75] Inventor: Gregory A. Kurkjian, Jr., Wheaton, Ill.

[73] Assignee: Henry Pratt Company, Aurora, Ill.

[21] Appl. No.: 626,195

[22] Filed: Dec. 12, 1990

[51] Int. Cl.$^5$ .................. F16K 43/00; F16K 5/20; F16K 25/00

[52] U.S. Cl. ..................... 137/15; 137/315; 251/174; 251/180; 251/315; 251/316; 251/360

[58] Field of Search ............. 137/15, 315; 251/174, 251/180, 181, 306, 307, 315, 316, 317, 360, 363

[56] References Cited

U.S. PATENT DOCUMENTS

| | | | |
|---|---|---|---|
| 3,393,697 | 7/1968 | Fawkes | 251/307 |
| 3,447,781 | 6/1969 | Fawkes | 251/315 |
| 3,986,699 | 10/1976 | Wucik, Jr. et al. | 251/307 |
| 4,006,883 | 2/1977 | Hilsheimer | 251/363 |
| 4,082,246 | 4/1978 | Rothwell | 251/307 |
| 4,220,172 | 9/1980 | Stager | 251/174 |
| 4,231,546 | 11/1980 | Eggleston et al. | 251/174 |
| 4,241,895 | 12/1980 | Sternenberg et al. | 251/174 |
| 4,258,901 | 3/1981 | Zinnai et al. | 251/174 |
| 4,398,695 | 8/1983 | Torche | 251/174 |
| 4,502,663 | 3/1985 | Huber | 251/174 |
| 4,593,916 | 6/1986 | Laulhe et al. | 251/306 |
| 4,928,921 | 5/1990 | Steele | 251/175 |

FOREIGN PATENT DOCUMENTS

| | | | |
|---|---|---|---|
| 966554 | 8/1957 | Fed. Rep. of Germany | 251/307 |
| 1231799 | 10/1960 | France | 251/174 |

OTHER PUBLICATIONS

Pp. 60–66 from the Henry Pratt Company catalog entitled "Pratt AWWA Rubber Seat Ball valves", printed Feb. 1988.

Willamette List 26-Metal Seated AWWA Ball Valves brochure by Willamette Corporation, undated.

Jamesbury Bulletin 244, entitled "Metal Seat Water-Sphere (Trademark) Butterfly Valves", from Jamesbury Corporation of Worcester, Massachusetts, undated.

*Primary Examiner*—George L. Walton
*Attorney, Agent, or Firm*—Tilton, Fallon, Lungmus

[57] ABSTRACT

A flexible seating apparatus is disclosed for use in rotary valves comprising a flexible seat ring attached to one of the valve body and valve closure member in a cantilevered fashion and maintained thereagainst by a resilient member, the latter being held captive in a pre-formed channel in the flexible seat ring. Slotted fastener holes spaced radially along the flexible seat and corresponding fasteners permit automatic axial ring adjustment and proper positioning of the flexible seat ring upon assembly and initial closure of the valve's closure member. An alternate embodiment is disclosed in which the flexible seat ring is mounted to the other of the valve body and the valve closure member. The present flexible seating apparatus can be used with rotary ball valves and butterfly valves, for example, and further, is advantageously used to permit droptight metal-to-metal valve seating.

17 Claims, 2 Drawing Sheets

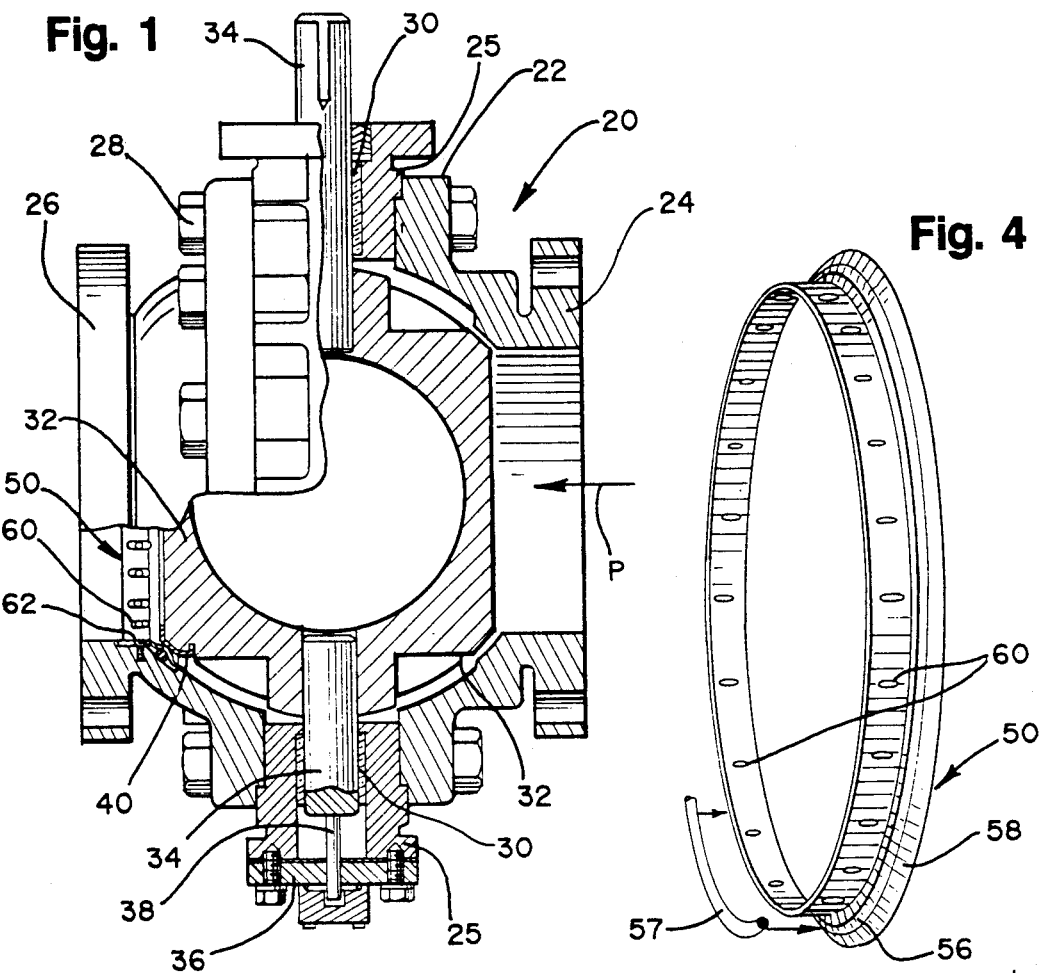
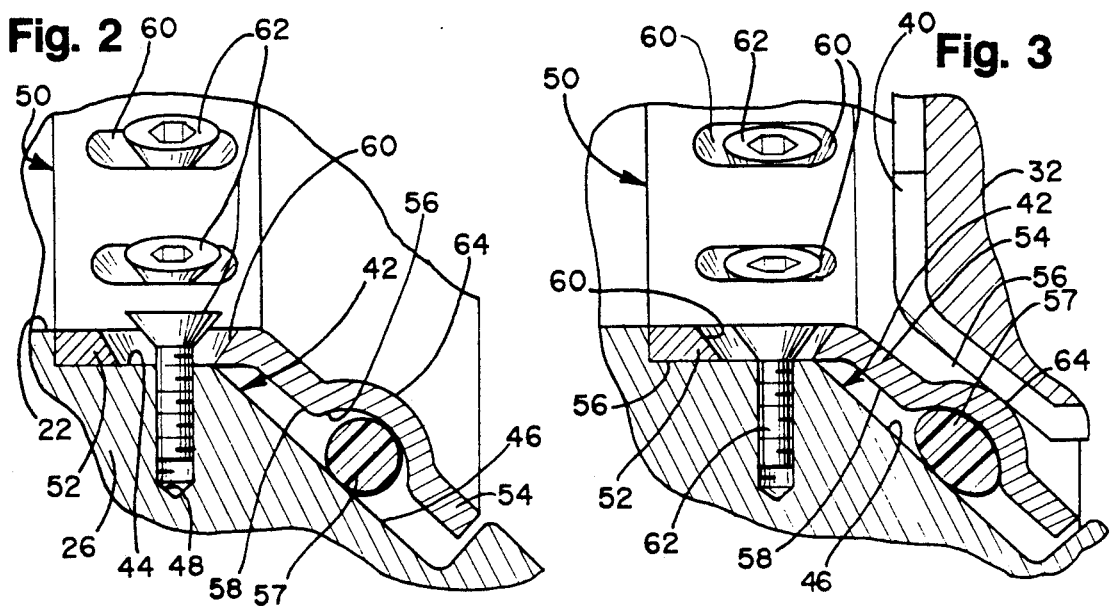

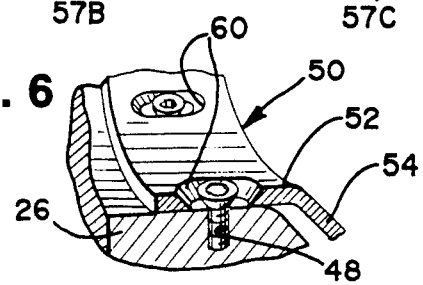
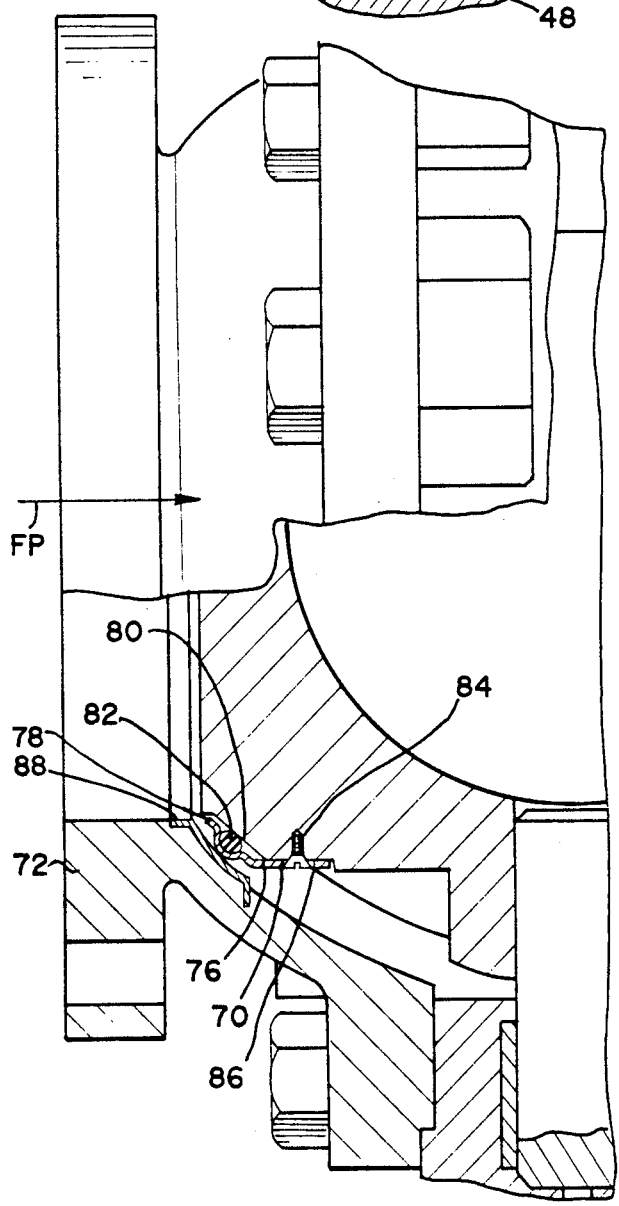
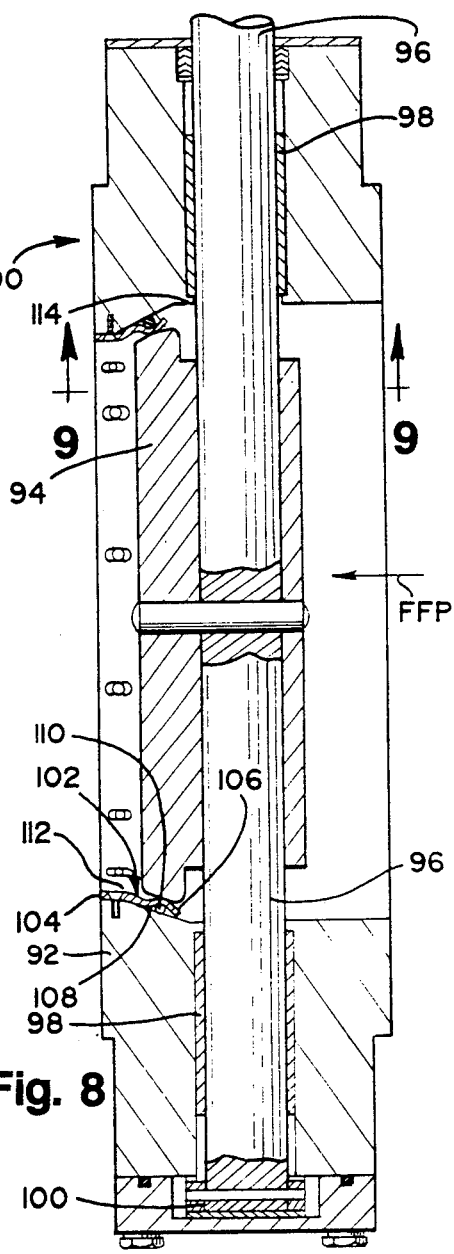
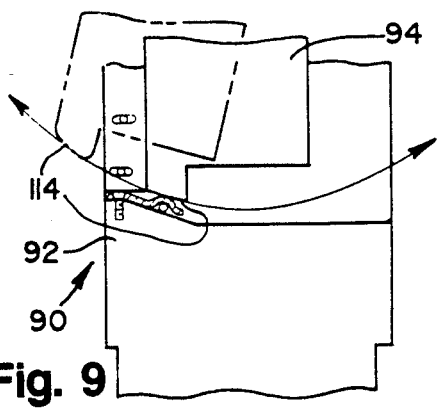

FLEXIBLE SEATING STRUCTURE FOR ROTARY VALVES

FIELD OF THE INVENTION relates to rotary valves, and more particularly to high performance sealing and seating apparatus for rotary valves.

BACKGROUND OF THE INVENTION

There have been many attempts to achieve a liquid-tight, high-pressure seal arrangement for use in rotary valves. One such method is disclosed in U.S. Pat. No. 3,447,781, which teaches the use of an elastomeric seat ring for mating engagement against a seal member received in an annular groove in the valve body. That type seating structure is disadvantageous in that no metal-to-metal sealing can occur, such as is needed with fluids where corrosive or abrasive conditions are present.

One metal-seated ball valve uses precision machined surfaces to effect closure. That design can also cause unnecessary wear on the mating parts due to the flat mating seating surfaces. Because of the flat surfaces, any small particle in the flow stream such as sand may prevent proper contact of the mating surfaces, thereby creating an inherent potential for leakage. Also, such design of valve seat is excessively costly to manufacture.

Such disadvantages found in the prior art seating devices for rotary valves are overcome by the present invention which utilizes a thin, flexible metal seat ring mounted along one or both cylindrical ends to the valve body, or alternatively to the valve closure member, such as the ball in a rotary ball valve. The flexible metal seat ring is cantilevered on its opposite cylindrical end to the valve body and held against the valve's closure member by means of a resilient bias member, such as an elastomeric O-ring. The bias member is held captive in a pre-formed channel in the metal sea ring. Slotted fastener holes are formed in radially spaced locations in the flexible seat ring which, with associated threaded fasteners, permit automatic axial adjustment of the seat ring upon assembly and initial closure of the valve's closure member.

Importantly, during assembly of the pressure-assisted valve seating apparatus of the present invention, the fasteners holding the flexible seat ring are not tightened until the closure member has been moved to its full closed position. Advantageously, during assembly, the resilient bias member acts both as a spring to hold the flexible seating ring in place and also to radially locate that ring concentrically and evenly adjacent the ball's seat surface. Such a biasing action during assembly allows the flexible seat ring to move radially in selected areas to accommodate variations in the associated closure member. In effect, as the ball initially closes during assembly, each portion of the flexible seat ring moves axially and radially of the valve closure member's seat to find the ideal seated position. Thereafter, the flexible seat ring's fasteners are tightened to permanently lock the ring in place.

Advantageously, the cooperation of the spherical seat surface on the valve's closure member with the continuous flexible seat ring permits a relative forgiveness therebetween, thereby assuring closure of the valve to its true seating position. A valve made in accordance with the present invention cannot bind due to valve deflections, since the seating ring is in flexible contact with the closure member. Thus, expensive high precision, high torque valve actuators are not required. Rather, less costly standard actuators can be used in rotary valves having the flexible sealing structure of the present invention.

The present design can also be produced with eccentric action to the rotating closure member wherein the closure member lifts off of the flexible seating ring as it rotates to the open position thereby reducing seat wear. This is easily accomplished by offsetting the closure member's axis of rotation a nominal amount, such as by ¼ inch.

Besides use in rotary ball valves, the pressure-assisted seating and sealing apparatus of the present invention can be used with other types of rotary valves, such as butterfly valves, for example.

The means by which the foregoing features and advantages of the present invention are accomplished and the manner of their accomplishment will be readily understood from the following specification upon reference to the accompanying drawings, in which:

FIG. 1 is a side elevation view of a ball valve having the improved sealing apparatus of the present invention, with certain parts broken away for better viewing;

FIG. 2 is an enlarged sectional view of the flexible seating component of the present invention in the pre-assembly condition;

FIG. 3 is similar to FIG. 2, but also including the ball rotor seating surface component, and depicting the closed and assembled condition;

FIG. 4 is a rear perspective view of the flexible seating ring and bias ring components of the present invention;

FIGS. 5A through 5C depict various cross sectional shapes for the bias ring element of the present invention;

FIG. 6 depicts the slotted fastener hole arrangement of the flexible seating ring of the present invention;

FIG. 7 is similar to FIG. 1, but depicts an alternate embodiment of the present invention in which the flexible seating ring has been mounted in another fashion;

FIG. 8 depicts the use of the flexible sealing apparatus of the present invention in a butterfly valve structure; and FIG. 9 depicts the closed position, and in phantom the partially opened condition, for the operating components of the butterfly valve of FIG. 8.

DESCRIPTION OF THE PREFERRED EMBODIMENT

Having reference to the drawings, wherein like reference numerals indicate corresponding elements, there is shown in FIG. 1 an illustration of a rotary ball valve generally denoted by reference numeral 20. The ball valve 20 comprises a body 22 formed of a right end piece 24, a center body piece 25 and a left end piece 26 all fastened together by suitable threaded fasteners 28. Rotatably journalled by bearings 30 mounted within the center body 25 is a closure ball member 32 having axially aligned shafts 34. A thrust bearing assembly 36 is mounted at the bottom of the center body 25 (see FIG. 1) and connected thereto by a stud 38 fastened to the bottom of the valve shaft 34. A generally "C"-shaped continuous hoop or ring seat member 40 is affixed to the outer seating area of the ball rotor 32. As is well known, the seat member 40 presents a spherical sealing and seating surface to the associated closure member, i.e., ball 32. To this point the foregoing is well known in the art and, for reference purposes, a description of such a ball valve can be found in U.S. Pat. No. 3,447,781.

The novel flexible seat ring structure of the present invention will now be described. An annular recess generally noted by reference numeral 42 is formed in the area of left body end piece 26 adjacent the C-shaped ring seat 40. The annular recess 42 generally comprises a horizontally-aligned undercut 44 (see FIG. 2) and an angled undercut 46. A series of threaded openings 48 (only one being shown in FIG. 2) are formed at radially spaced locations along the annular recess 42.

A flexible seat ring member, generally denoted by reference numeral 50 (see FIGS. 1-4), comprises a thin generally cylindrical segment 52 having a downwardly and outwardly extending flexible flange segment 54 integrally formed therewith. The flange segment 54 has an annular recess or channel 56 formed along the outer surface 58. Formed along the cylindrical ring segment 52, at spaced locations corresponding to the threaded openings 48 formed on left body end piece 26, are a series of countersunk slotted holes 60 (best seen in FIGS. 2-4 and 6).

A resilient ring-shaped bias member 57 is located within the annular channel 56 so as to bear against the angled undercut 4 of left body end piece 26. Although not required for the satisfactory operation of the present invention, an appropriate adhesive (such as cyanoacrylate, for example) can be used to attach and retain the resilient bias member 57 to the annular channel 56, such as in extremely high fluid pressure applications. Preferably, the resilient ring-shaped bias member 57 is an O-ring member and is formed of Nitrile rubber. Alternatively, the bias member 57 can take a square shape 57A (FIG. 5A), or a triangular shape 57B (FIG. 5B), or a generally cross-shaped configuration 57C (FIG. 5C), or even other suitable configurations. Also, depending upon the valve applications (extreme temperature or corrosive conditions, for example) with which the present invention can be used, the bias member 57 can alternatively be made of Buna-N rubber, viton, or ethylene propylene. In any event, the bias member 57 will preferably be made of a material suitable for an operating temperature range of from below freezing to 300° F.

Turning to a description of the assembly of the flexible seat ring member 50 to the valve body 22, FIG. 2 shows that the axial length of the cylindrical ring segment 5 is such as to allow it to be seated tightly within the recess 42 formed in left body end piece 26. That is, the cylindrical segment 52 of ring 50 is inserted so as to lie within the horizontal undercut 44 of end piece 26, while the angled flange segment 54 generally lies within, but does not directly engage, i.e., is flexibly cantilevered over, the angled undercut 46 on end piece 26. A series of threaded fasteners, such as flathead fasteners 62, are each inserted through the slotted openings 60 and received within the openings 48 in end piece 26. During this initial portion of the assembly of ring member 50, the ball 32 is first rotated to and maintained at its fully opened position such that there is no engagement of the ball's seat 40 against the flexible seat 50; the fasteners 62 ar only partially tightened at this point (see FIG. 2). Thereafter, the ball 32 is rotated to its fully closed position (see FIGS. 1 and 3). In that closed condition, the ball's spherical seat 40 engages the upper raised surface 64 of angled flange segment 54 on flexible seat ring member 50 (as best seen in FIG. 3).

During assembly of the flexible seat ring 50 to the valve body 26, the bias member 57 operates to uniformly bias the annular channel 56, and hence seat ring 50, inwardly and rightwardly (see FIGS. 1 and 2) towards the ball 32 Thereafter, when the ball 32 has been rotated to its fully closed position and the C-shaped ring seat 40 has engaged the upper surface 64 of flexible seat ring 50, the cantilevered ring flange segment 54 is biased downwardly and to the left (FIG. 3). This acts to compress the bias ring 57 between the annular channel 56 and the angled undercut surface 46 on body 26. In effect, the bias ring 57 acts to continually radially force the cantilevered ring flange segment 54 against the ball seat 40 such that the flexible seat ring 50 correctly finds, all along its circumference, the proper closed position relative to the ball seat 40 during valve assembly. This biasing action of bias member 57 coupled with flexibility inherent in thin ring member 50 also causes that ring 50 to move, at some locations locally along its circumferential length, to the left (i.e., axially in FIG. 3) relative to a respective fastener 62. Such axial movement of flexible ring 50 is permitted because of the slotted openings 60 relative to the shafts of the fastener 62 (as best seen in FIG. 6) coupled with the biasing force of resilient bias ring 57.

Thereafter, when the fully closed ball 32 has effected a final positional placement of the partially-tightened flexible seat ring 50 relative to the left end piece 26, the fasteners 62 are fully tightened within the slotted openings 60. The countersunk edge of such a slotted opening 60 cooperates with the chamferred head of the associated flathead fastener 62 so as to permit complete tightening of the fasteners; this tightening acts to positionally retain the flexible seat ring member 50 which through such assembly has now found its ideal seating position relative to the ball seat 40. More specifically, in the localized area around each countersunk slotted opening 60, it will be understood that the tightening of the fastener 62, in effect, crimps the ring member 50 down against the horizontal undercut 44 of left end piece 26; this crimping acts to lock the ring 50 in position to end piece 26 at that location once properly aligned during assembly.

It has been found that the width of the slot 60 is rather critical, i.e., the width of the slot 60 at its narrowest point along the outer surface 58 of flexible seal ring 50 must be sufficiently narrow relative to the outer diameter of the threaded fastener 62 so as to obtain a dimpling effect of ring 50 about the slotted hole 60. This enables a small portion of the material of ring 50 to be forced down into the fastener hole 48, so as to create and maintain a positive positioning of the flexible seat ring 50. It has been found that in one valve made in accordance with the present invention, the slotted hole 60 should be approximately ½" long for a 12" diameter valve, for use with 3/16" diameter fasteners, while the slotted hole 60 should be ¾" long for use in a 16" valve, for use with ⅜" fasteners. Thus, it will be seen that the slotted hole is preferably elongated as much as ¼" over the size of the fastener 62, so as to accommodate a proper radial movement of the seat ring 50 during assembly, yet provide the above-described crimp locking feature.

It will be understood that the recess 42 formed on body end piece 26 is created so as to allow the flexible seat ring 50, when it has been securely tightened against body 26 by fasteners 62, to be completely out of the fluid flow path (indicated by reference letter and arrow as "P" in FIG. 1). Advantageously, the lack of anything protruding into the flow path P prevents the unwanted disruption of fluid flow during any localized high velocity flow conditions, such as may occur during opening and closing of the valve ball 32. (As seen in FIG. 1, the fluid flow path P for valve 20 is normally from right to left.) When flow is in both directions, another flexible seat ring structure of the present invention can be placed in the right end piece 24 (see FIG. 1).

The relative thickness of the flexible seat ring 50 will vary with the size of the valve 20; it must be sufficiently thick enough to sustain handling during assembly and also to achieve the proper seating strength when in use, yet be thin enough to provide the above-described locale flexibility during initial assembly and during sealing operation. It has been found that for a 12" valve, the thickness of flexible ring 50 is preferably 0.05". A preferred range of thickness for ring 50 is between 0.03" and 0.09".

To prevent unwanted galling between the ball seat surface 40 and the surface 64 of flexible seat ring 50, it is preferable to use different corrosion resistant materials when forming these component parts. Preferably, the ball seat 40 is formed of stainless steel, such as Type 304 or Type 316, for example, while the flexible seat ring 50 is made from a different type of stainless steel (such as Type 410 or Type 416 for example), or even of monel or inconel. Additionally, the ball seat surface 40 could be non-metallic, such as formed of a different material in a spray overlay (plasma or ceramic spray, for example) or weld overlay technique.

During normal operation of the flexible seat ring 50, as the ball 32 closes to shut off valve 20, the fluid pressure behind the flexible seat ring 50 tends to deflect it towards the ball seat 40, i.e., there is an inherent pressure-assisted seating force present. That is, once the valve closure member has closed, hydrostatic pressure moves the ball, in effect, further into the flexible seat creating a tighter seal in proportion to the service pressure. This increased seating force combines with the action of the bias ring 57 against the flexible seat ring 50 to effect a droptight metal-to-metal seal of ring 50 against seat 40. Advantageously, the flexible seating seal of the present invention can provide a droptight seal for severe service applications, e.g., 300 psig or greater.

Thus, it is seen that the bias ring 57 advantageously operates both as a pressure-assisted seal, as well as a biasing member to help force the seat ring 50 against the ball seat 40, both during assembly and in actual operation.

A rotary valve made in accordance with the present invention is more so-called forgiving in reaching its closed position because the valve will become closed within plus or minus one degree of the true closing position. This means that the ball 32 can be rotated on degree off of the true closing position yet no difference or effect is seen to the watertight sealing of the ball seat 40 vis-a-vis the flexible seat ring 50. That is, the spherical seat 40 of ball 32 cooperates with the biased flexible seat ring 50 to give a relative forgiveness, i.e., a positioning leeway, for the true sealing and seating position of those respective mating parts. This inherent positional leeway of the present invention is a significant advantage over the prior art valves where no such leeway was permissible. Typically, in a ball valve having a 12 inch diameter, such a positional leeway for the present invention has been found to be plus or minus one degree of rotation by the ball 32. This translates into a dimensional range of positional leeway for the flexible seat ring 50 of approximately 0.100" between unseated and fully seated positions.

It will be understood that wiping action of the mating valve seat surfaces (i.e., flexible seat ring 50 and ball seat 40) during cycling of the valve 20 acts to prevent buildup of harmfull debris between those mating surfaces. This wiping action is enhanced by the curved nature of the flexible seat ring surface 64 relative to the seat 40 of mating ball 32.

This curvature provides a live contact between such mating surfaces which better removes particles and debris therefrom, which advantageous wiping action is not provided by the mating flat surfaces of the prior art. Those flat surfaces in the prior art, with planar contact, may capture particles and debris and thereby cause scoring and valve seat damage.

The use of the flexible seat ring 50 of the present invention is not limited to simply uni-directional seal valves, i.e., valves having only one seating construction. It can be used for two-seated assemblies, such as in applications where the fluid flow pressure occurs in both directions.

The use of the present invention is also not restricted to valves where the flexible seating ring is fastened to the valve body, such as depicted in the preferred embodiment described above. Instead, as shown in FIG. 7, the flexible seat ring member, generally designated by reference numeral 70 and preferably formed from a thin metal material, is fastened not to the end piece 72, but instead to the ball closure member 74. Again, as with the flexible ring 50 of the preferred embodiment (FIGS. 1-6), the flexible seat ring 70 is integrally formed of two generally cylindrical sections, namely a cylindrical segment 76 and a flange segment 78, the latter carrying within an annular recess 80 a resilient bias ring member 82. Similarly, a series of fasteners 84 are fitted within radially-spaced, slotted countersunk holes 86; these are used to hold the flexible seat ring 70 against the closure ball 74.

In operation, the flexible seat ring 70 is biased by the resilient bias member 82 against a metal seat 88 retained on valve end piece 72. Other than this alternate way of mounting the flexible seat ring 70 to the movable closure ball 74, rather than to the stationary valve end piece 72, this alternate embodiment of the present invention operates in the same fashion as does the above-described preferred embodiment. As seen in FIG. 7, fluid pressure flowing in the direction of flow path (designated by reference letters and arrow as "FP") provides a pressure-assisted seating force to the cantilevered flange segment 78 of flexible seat ring 70, all in similar fashion and towards the same benefits as to the pressure-assisted seating force achieved by the preferred embodiment noted above.

While not necessary to the successful operation of the present invention, it can be enhanced by adding an eccentric action to the rotating closure member (i.e., ball 32) wherein that closure member lifts away from the flexible seat ring 50 as the closure member is rotated to the open position. Although not shown, this can be easily accomplished by offsetting the closure member's axis of rotation (i.e., shaft 34) a nominal amount, such as by ¼ inch, to produce such an eccentric action.

The present invention can also be used in other types of rotary valves, such as butterfly valves, for example. Depicted in FIGS. 8 and 9 is a butterfly valve, generally denoted by reference numeral 90, comprising a valve body 92, and a rotatable disk or plug member 94 pivoted for rotation relative to the body 92 on a plug shaft 96 journalled within bearings 98 and a thrust bearing 100. As seen in FIGS. 8 and 9, a relatively thin flexible seat ring 102 is fastened by threaded fasteners 104 to the valve body 92. Ring 102 is also preferably made of metal. Similar to the flexible seat ring 50 of the preferred embodiment, the flexible seat ring 102 used for the butterfly valve 90 is formed of a cylindrical segment 104 and a cantilevered flange section 106 which includes an annular recess 108 for retaining a resilient bias member 110.

As with the preferred embodiment, the cylindrical segment 104 of seat ring 102 includes a series of slotted, countersunk holes 112 which respectively carry threaded fasteners 114; these are used to positionally locate and then retain the flexible seat ring 102 to the valve body 92 after the valve 90 is assembled in the same manner as noted above with regard to the preferred embodiment.

A preferably metal seat surface 114 is formed on the butterfly disk 94. When the disk 94 is in its closed position (see FIG. 8), the seat surface 114 engages the flange segment 106 of flex ring 102 adjacent the recess 108; this engagement forces the flexible ring 102 against the bias ring member 110 to again create a droptight seal, similar to that described above with the preferred embodiment. Similarly, the bias ring 110 effects proper localized positioning of the flex ring 102 relative to the valve body 92 (via slotted holes 112 and associated threaded fasteners 84) during assembly of the butterfly valve 90.

Again, pressurized fluid traveling along the fluid flow path (designated by reference letters and arrow as "FFP" in FIG. 8) tends to create a pressure-assisted droptight seal of flange segment 106 of flexible seat ring 102 against the seating surface 114 on butterfly disk 94. As shown in phantom in FIG. 9, rotation of the disk 94 into its fully closed position (shown in solid for disk 94 in FIG. 9) effects a droptight metal-to-metal seal of plug disk 94 against flex ring 102 on body 92.

Again, because of the dual function of bias ring 110 (i.e., pressure assisted sealing element and biasing element), the flex ring 50 continuously provides uniform localized engagement of flex ring 102 against the seat surface 114 without creating any valve binding. Thus, as shown in FIG. 9, the butterfly disk 94 can travel into flexible seating ring 102, i.e., into the valve's closed position, and then on through that fully closed position, if desired, such that overtravel of butterfly disk 94 will not create unwanted binding of butterfly valve 90.

Advantageously, the present design permits the valve's closure member, i.e., ball or disk, to rotate 360° continuously, even though in most applications the closure member cycles, i.e., reciprocates, between its full open and full closed positions. This feature of having the closure member be able to rotate continuously 360° is due to the present invention's unique flexible seating ring and resilient bias ring, which together cooperate to prevent the closure member from binding up at the valve's full closure position.

It can be seen that rotary valves incorporating the flexible seat ring of the present invention provides tighter shutoff and lower operating torques than conventional rigid seat valves. An economy of manufacture is obtained with this invention by using thin seat sections that can be rolled or spun from sheet material. The adjustable seating feature and the resilience of the backup bias ring provide forgiveness in the present valve's assembly and its use. The design of the present invention allows valves to be economically constructed in a wide range of sizes from 4" to 60" in diameter.

From the foregoing, it is believed that those skilled in the art will readily appreciate the unique features and advantages of the present invention over previous types of rotary valves. Further, it is to be understood that while the present invention has been described in relation to particular preferred and alternate embodiments as set forth in the accompanying drawings and as above described, the same nevertheless are susceptible to change, variation and substitution of equivalents without departure from the spirit and scope of this invention. It is therefore intended that the present invention be unrestricted by the foregoing description and drawings, except as may appear in the following appended claims.

I claim:

1. A flexible high performance closure seal for a rotary valve having a valve body and a rotatable closure member for closing off a fluid passage through the valve body, comprising:

a sealing seat formed on one of the valve body and the rotatable closure member;

a flexible seat ring of relatively thin material mounted to the other of said valve body and said rotatable closure member, said flexible seat ring including two generally cylindrical sections, at least one of said sections being flexibly cantilevered adjacent said other of said valve body and said rotatable closure member and presenting a flexible seating surface to said sealing seat during closure of said closure member;

a plurality of adjustable mounting means for permitting initial loose mounting of said flexible seat ring to said other of said valve body and said closure member, said adjustable mounting means thereby permitting proper positioning movement of said flexible seat ring relative to said other of said valve body and said closure member during assembly of said rotary valve, and further permitting secure mounting of said flexible seat ring after said proper positioning has occurred;

a resilient bias member retained between said flexible seat ring and said other of said valve body and said closure member to uniformly bias said flexible seat ring generally axially against said sealing seat during assembly of said rotary valve, thereby permitting proper positioning of said flexible seat ring and assuring proper centered mating engagement of said flexible seat ring and said sealing seat during assembly of said rotary valve, said resilient bias member continuously biasing said flexible cantilevered section of said flexible seat ring against said sealing seat during normal operational closure of said closure member.

2. The invention of claim 1, wherein said resilient bias member is retained by said at least one flexibly cantilevered section of said flexible seat ring.

3. The invention of claim 2, and an annular recess formed in said at least one flexibly cantilevered section for retaining said resilient bias member.

4. The invention of claim 1, wherein said plurality of adjustable mounting means comprise a plurality of slotted mounting openings formed on said flexible seat ring and a plurality of associated mounting members extending respectively therethrough, said slotted openings and said mounting members cooperating to adjustably mount said flexible seat ring to said other of said valve body and said closure member, whereby said slotted openings permit positioning movement of said flexible seat ring relative to said other of said valve body and said closure member during assembly of the rotary valve when said associated mounting members are in a partially tightened condition.

5. The invention of claim 1, wherein said resilient bias member is an elastomeric ring.

6. The invention of claim 1, wherein said rotary valve is a ball valve.

7. The invention of claim 7, wherein said flexible seat ring is mounted to said valve body.

8. The invention of claim 1, wherein said rotary valve is a butterfly valve.

9. The invention of claim 9, wherein said flexible seat ring is mounted to said valve body.

10. The invention of claim 1, wherein said flexible seat ring is made of metal.

11. The invention of claim 10, wherein said metallic flexible seat ring is formed of stainless steel.

12. The invention of claim 10, wherein said metallic flexible seat ring is formed of monel.

13. A high performance seal for a rotary valve having a valve body with a fluid passage, and a rotatable closure member to close off the fluid passage, comprising in combination:
- a valve seat formed on one of said valve body and said closure member;
- a flexible seat ring of relatively thin material mounted to the other of said valve body and said closure member, said flexible seat ring being adjustably positionable through adjustable mounting means to said other of said valve body and closure member during assembly and initial closure of said rotary valve and thereafter firmly secured thereto by said adjustable mounting means, after said flexible seat ring has been properly positioned said flexible seat ring having at least one cylindrical segment cantilevered adjacent said other of said valve body and said closure member to present a flexible seating surface to said valve seat; and
- resilient bias means retained between said one cylindrical segment of said flexible seat ring to bias said flexible seat ring to its proper seated position on said other of said valve body and said closure member relative to said valve seat during assembly and initial closure of said rotary valve, and further to continuously bias said flexible seat ring against said valve seat during closure of said closure member, after said flexible seat ring has been properly positioned and firmly secured.

14. The method of providing a watertight seal for a rotary valve having a valve body, and a rotatable closure member for closing off a fluid passage through the valve body, comprising the steps of:
- providing a sealing seat to one of the valve body and the rotatable closure member;
- loosely mounting a flexible seating ring formed of a relatively thin material to the other of said valve body and said rotatable closure member with adjustable mounting members, such that said flexible seating ring presents a flexible seating surface to said sealing seat during valve closure;
- positioning a resilient bias member between said flexible seating ring and said other of said valve body and said closure member to bias said flexible seating ring against said sealing seat when said closure member is initially closed, thereby permitting proper centered positioning of said flexible seating ring relative to said sealing seat during assembly of said rotary valve, as well as thereafter providing continuous biasing of said flexible seating ring during normal valve closure;
- closing said closure member during assembly of said rotary valve such that said flexible seating ring finds its proper sealing position with said sealing seat; and
- firmly securing said adjustable mounting members whereby said flexible seating ring is firmly secured in said proper centered sealing position.

15. The invention of claim 8, and the step of forming said flexible seating ring of metal.

16. The method of fabricating a rotary valve having a high performance seal, comprising the steps of:
- providing a valve body having a fluid flow passage;
- providing a rotatable closure member within said valve body to control fluid flow through said passage;
- providing a sealing seat on one of said valve body and said rotatable closure member;
- providing an adjustably mounted flexible seating ring on the other of said valve body and said rotatable closure member, whereby initially during rotary valve assembly said flexible seating ring is loosely mounted thereto;
- providing a resilient biasing member between said flexible seating ring and said other of said valve body and said rotatable closure member, for biasing said flexible seating ring against said sealing seat;
- closing said rotatable closure member during said initial rotary valve assembly to properly position said loosely mounted flexible seating ring relative to said sealing seat; and
- firmly securing said flexible seating ring once in its proper sealing position to the other of said valve body and said rotatable closure member, whereby said flexible seating ring presents a continuously biased flexible seating surface to said sealing seat during rotary valve closure after said flexible seating ring has been firmly secured.

17. The invention of claim 4, wherein said associated mounting members comprise threaded fasteners.

* * * * *

UNITED STATES PATENT AND TRADEMARK OFFICE
CERTIFICATE OF CORRECTION

PATENT NO. : 5,069,240

DATED : December 3, 1991

INVENTOR(S) : Gregory A. Kurkjian, Jr.

It is certified that error appears in the above-identified patent and that said Letters Patent is hereby corrected as shown below:

In Claim 1, column 8, line 52, "flexible" should be --flexibly--;

Claim 7, column 9, line 11, "7" should be --6--;

Claim 9, column 9, line 15, "9" should be --8--;

Claim 13, column 9, line 37, after "positioned" insert a --,--; and

Claim 15, column 10, line 24, "8" should be --14--.

Signed and Sealed this

Twenty-seventh Day of April, 1993

*Attest:*

MICHAEL K. KIRK

*Attesting Officer*   Acting Commissioner of Patents and Trademarks